(12) United States Patent
Kagenishi

(10) Patent No.: US 6,807,807 B2
(45) Date of Patent: Oct. 26, 2004

(54) EXHAUST GAS PURIFYING APPARATUS AND EXHAUST GAS PURIFYING METHOD FOR AN INTERNAL COMBUSTION ENGINE

(75) Inventor: Masao Kagenishi, Yokohama (JP)

(73) Assignee: Mitsubishi Fuso Truck and Bus Corporation, Tokyo (JP)

( * ) Notice: Subject to any disclaimer, the term of this patent is extended or adjusted under 35 U.S.C. 154(b) by 0 days.

(21) Appl. No.: 10/720,221

(22) Filed: Nov. 25, 2003

(65) Prior Publication Data

US 2004/0139739 A1 Jul. 22, 2004

(30) Foreign Application Priority Data

Nov. 25, 2002 (JP) ........................................ 2002-341120

(51) Int. Cl.$^7$ ................................................. F01N 3/00
(52) U.S. Cl. ............................ 60/288; 60/295; 60/297; 60/311
(58) Field of Search ........................ 60/274, 288, 291, 60/297, 295, 311

(56) References Cited

U.S. PATENT DOCUMENTS 6,718,757 B2 * 4/2004 Khair et al. ................... 60/286

FOREIGN PATENT DOCUMENTS

| JP | 7-259533 A | 10/1995 |
| JP | 8-319820 | * 12/1996 |
| JP | 2001-115822 A | 4/2001 |

* cited by examiner

Primary Examiner—Thomas E. Denion
(74) Attorney, Agent, or Firm—Birch, Stewart, Kolasch & Birch, LLP

(57) ABSTRACT

An exhaust gas purifying apparatus has a particulate filter, an oxidation catalyst, a front oxidation catalyst, a bypass path, and a passage switching device, in an exhaust gas path. The front oxidation catalyst is disposed further upstream than the oxidation catalyst. The bypass path bypasses the upstream side and the downstream side of the front oxidation catalyst. The passage switching device switches the flow of exhaust gas to the front oxidation catalyst side or the bypass path side. When the filter is forcibly recovered, the temperature of the exhaust gas is raised, and is made to pass through the front oxidation catalyst. After the oxidation catalyst is activated, the flow of the exhaust gas is switched by the passage switching device, and the exhaust gas is made to pass through the bypass path.

8 Claims, 4 Drawing Sheets

EXHAUST GAS PURIFYING APPARATUS AND EXHAUST GAS PURIFYING METHOD FOR AN INTERNAL COMBUSTION ENGINE

CROSS-REFERENCE TO RELATED APPLICATIONS

This application is based upon and claims the benefit of priority from the prior Japanese Patent Application No. 2002-341120, filed Nov. 25, 2002, the entire contents of which are incorporated herein by reference.

BACKGROUND OF THE INVENTION

1. Field of the Invention

The present invention relates to an exhaust gas purifying apparatus and an exhaust gas purifying method for an internal combustion engine, wherein a filter for collecting particulates exhausted from the internal combustion engine, and reactivating element for recovering the function of the filter are provided.

2. Description of the Related Art

As an example of an internal combustion engine, there is a diesel engine. The diesel engine has an exhaust gas purifying apparatus in the exhaust gas path. The exhaust gas purifying apparatus has a diesel particulate filter (DPF) and a reactivating unit. The DPF collects particulates such as black smoke, soot, HC, and the like, which are included in the exhaust gas. The recovery unit is disposed further upstream than the DPF in order to maintain the function of the DPF. The recovery unit has an oxidation catalyst, and NO and $O_2$ included in exhaust gas are made react with each other, and $NO_2$ is generated. The generated $NO_2$ reacts with the particulates. As a result, the particulates collected at the filter are eliminated, and the DPF is recovered.

The particulates react with $O_2$ at an ambient temperature of about 550° C. or more, and react with $NO_2$ at an ambient temperature of about 250° C. or more. In a case of a continuous operating state such that the engine is maintained to have a constant number of revolution or more, a temperature of exhaust gas is maintained at about 250° C. or more. In this continuous operating state, provided that $NO_2$ is supplied by the recovering unit, the DPF can realize the so-called continuous recovering state in which particulates are burnt while collecting the particulates.

However, if light load operation continues, the temperature of the exhaust gas falls. As a result, because it is difficult to maintain the temperature of the oxidation catalyst disposed further upstream than the DPF at an activation temperature, there are cases in which recovery of the DPF is insufficient. In the exhaust gas purifying apparatus, if the recovering function deteriorates, the DPF is in an over-collected state, and clogging by particulates arises. As a result, an exhaust gas pressure increases, and the fuel efficiency and the power performance of the engine deteriorate.

Then, a recovering unit in which, due to an operating state of an engine being controlled, an amount of $NO_2$ is increased by increasing an exhausted amount of NO, or reaction between $NO_2$ and particulates is promoted by raising a temperature of exhaust gas, is disclosed in Jpn. Pat. Appln. KOKAI Publication No. 2001-115822. The recovering unit estimates an amount of the accumulated particulates collected at the DPF by one of an exhaust gas sensor, an engine speed sensor, an engine load sensor, an engine operating timer, an intake air amount sensor, an NOx sensor, an $O_2$ sensor, and an exhaust gas temperature sensor. The recovering unit controls one of the fuel injection period and injected amount of a fuel injector, the opening of an EGR valve of an EGR (Exhaust Gas Re-circulation) device, the intake air amount of a turbosupercharger, the opening and closing periods and lift amounts of an intake air valve and an exhaust gas valve which are provided at the respective cylinders, and the opening of an intake air throttle valve provided in an intake air path.

Further, an exhaust gas particulate purifying apparatus having fuel injecting means for injecting fuel to the upstream side of the DPF is disclosed in Jpn. Pat. Appln. KOKAI Publication No. 7-259533. The exhaust gas particulate purifying apparatus has a filter whose catalyst is coated, a temperature sensor for detecting a temperature of the filter, and fuel injecting means for injecting fuel to the upstream side of the filter on the basis of a temperature signal of the temperature sensor. The exhaust gas particulate purifying apparatus determines a recovery time of the filter on the basis of the temperature detected at the temperature sensor, and controls an injection timing and amount of fuel. Further, the exhaust gas particulate purifying apparatus additionally injects fuel into a cylinder during the expansion stroke, and makes oxygen of excess air and fuel remaining in the cylinder react with each other, and raises the temperature of exhaust gas. The exhaust gas whose temperature has been raised warms the filter having the catalyst so as to be greater than or equal to the activation temperature of the catalyst. Then, the warmed catalyst oxidizes the additionally injected fuel. The particulates collected at the filter are burnt by heat of reaction at the time of oxidizing fuel. When a state in which the temperature of the filter is greater than or equal to an ignition temperature of particulates passes a predetermined time, fuel injection from the expansion stroke to the exhaust stroke is stopped, and the reproduction of the filter is completed.

However, when the so-called forcible recovery is executed by raising the temperature of exhaust gas due to the load of the engine being varied such that the oxidation catalyst becomes an activation temperature in order to recover the filter, a larger number of particulates are included in the exhaust gas as compared with exhaust gas under normal operating conditions. Then, the particulates generated during the time until the oxidation catalyst reaches the activation temperature adhere to the oxidation catalyst. When the forcible recovery is repeated, the oxidation catalyst is gradually covered with particulates, and the function thereof cannot be sufficiently performed. As a result, in the exhaust gas purifying apparatus, the function of continuously recovering a filter deteriorates.

An exhaust gas purifying apparatus for an internal combustion engine which can improve a forcible recovery function while maintaining the continuous recovery function of a filter for collecting particulates included in exhaust gas of the internal combustion engine, has been desired.

BRIEF SUMMARY OF THE INVENTION

An exhaust gas purifying apparatus for an internal combustion engine according to the present invention comprises a particulate filter, an oxidation catalyst, and forcible recovering control element. The particulate filter is disposed in an exhaust gas path, and collects particulates in exhaust gas. The oxidation catalyst is disposed in the exhaust gas path in further upstream than the particulate filter. At the time of forcibly recovering the particulate filter, after the forcible recovering control element executes catalytic temperature raising control in which the catalyst is activated by rising an exhaust gas temperature of the internal combustion engine, the forcible recovering control element executes filter temperature raising control in which the temperature of the filter is raised by supplying unburned fuel to the oxidation catalyst.

The exhaust gas purifying apparatus further comprises a front oxidation catalyst, a bypass path, and a passage switching device. The front oxidation catalyst is disposed in the exhaust gas path further upstream than the oxidation catalyst. The bypass path is provided in the exhaust gas path so as to bypass the front oxidation catalyst. The passage switching device switches the flow of exhaust gas to the front oxidation catalyst side or the bypass path side. The passage switching device switches the flow of exhaust gas to the front oxidation catalyst side at the time of executing the catalytic temperature raising control, and switches the flow of exhaust gas to the bypass path side at the time of executing the filter temperature raising control.

When the filter is forcibly recovered, at the time of executing the catalytic temperature raising control, the passage switching device switches the flow of exhaust gas to the front oxidation catalyst side. The front oxidation catalyst positioned further upstream than the oxidation catalyst is raised in temperature for a short period, and a rise of the temperature of the exhaust gas flowing at the oxidation catalyst downstream is promoted by heat of catalyst reaction. The oxidation catalyst is efficiently activated, and the soot exhausted from the engine is oxidized and burnt by the front oxidation catalyst which becomes a relatively high temperature accompanying a rise of the temperature of exhaust gas of the engine. Accordingly, at the same time when the soot can be prevented from adhering to the oxidation catalyst, activation of the oxidation catalyst can be further promoted by heat due to the soot being burnt.

Thereafter, at the time of executing the filter temperature raising control, the passage switching device switches the flow of exhaust gas to the bypass path side. Accordingly, the exhaust gas purifying apparatus can reliably burn unburned fuel by the oxidation catalyst, and can efficiently raise the temperature of the filter and efficiently recover the filter.

As a preferred mode of the invention, the front oxidation catalyst may be structured so as to have a capacity smaller than that of the oxidation catalyst downstream. In this case, at the time of executing the catalytic temperature raising control, the smaller the capacity of the front oxidation catalyst, the shorter the time in which the temperature of the front oxidation catalyst is raised to a sufficient temperature.

Further, a passage switching device of another preferred mode makes exhaust gas flow to the bypass path side by switching the flow other than at the time of the catalytic temperature raising control, in order to prevent the exhaust pressure of the internal combustion engine at the time of normal operation from rising. In order to efficiently execute forcible recovery of the filter, a temperature sensor may be provided between the oxidation catalyst and the filter. It is preferable as well that a temperature of the inlet of the filter is detected by the temperature sensor, and the passage switching device is operated by the forcible recovering control element on the basis of the detected temperature. Moreover, in order not to change the rate of flow and the pressure of exhaust gas, it is preferable as well that a cross-sectional area of the passage of the front oxidation catalyst and a cross-sectional area of the passage of the bypass path are determined in consideration of the pressure loss. The passage switching device may have valves on the respective front oxidation catalyst side and bypass path side, and the valves may be respectively structured so as to be separately openable and closable.

An exhaust gas purifying method for an internal combustion engine according to the present invention comprises: by using the above-described exhaust gas purifying apparatus, a step of switching, by the passage switching device, the flow of the exhaust gas to the front oxidation catalyst side at the time of executing the catalytic temperature raising control; and a step of switching, by the passage switching device, the flow of the exhaust gas to the bypass path side at the time of executing the filter temperature raising control. Further, the exhaust gas purifying method for an internal combustion engine according to the invention may comprise a step of switching, by the passage switching device, the flow of the exhaust gas to the bypass path side other than at the time of executing the catalytic temperature raising control.

BRIEF DESCRIPTION OF THE SEVERAL VIEWS OF THE DRAWING

Drawings appended to this specification are for explanation of the preferred embodiment of the present invention.

DETAILED DESCRIPTION OF THE INVENTION

Figure 1:
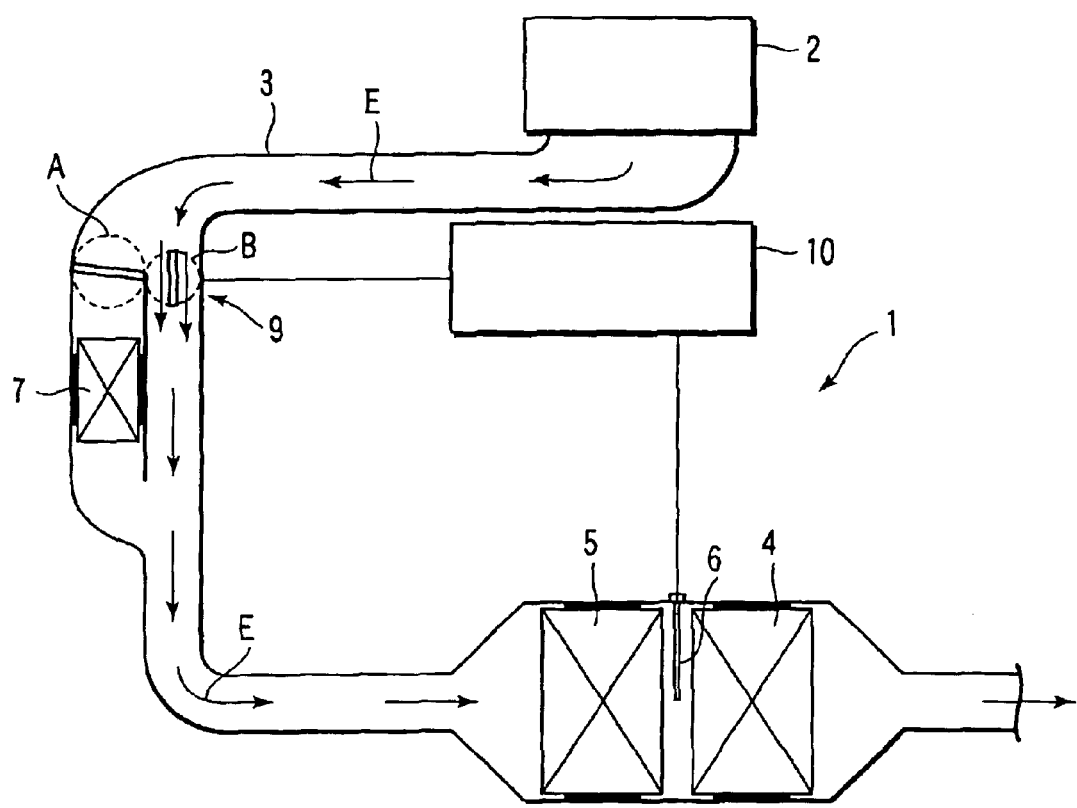
FIG. 1 is a diagram showing an exhaust gas purifying apparatus of a first embodiment according to the present invention.

An exhaust gas purifying apparatus 1 of an embodiment according to the present invention will be described with reference to FIGS. 1 to 4. As shown in FIG. 1, the exhaust gas purifying apparatus 1 is provided in an exhaust gas path 3 of an internal combustion engine, concretely, a diesel engine 2. The exhaust gas purifying apparatus 1 has a filter 4, an oxidation catalyst 5, a temperature sensor 6, a front oxidation catalyst 7, a bypass path 8, a passage switching device 9, and a control unit 10.

The filter 4 collects particulates such as black smoke, soot, HC, and the like, which are included in exhaust gas E exhausted from the engine 2. The oxidation catalyst 5 is provided on the upstream side of the filter 4, and activates an oxidative reaction of NO and $O_2$ included in the exhaust gas E by a catalytic reaction. In accordance therewith, $NO_2$ is generated.

The temperature sensor 6 is disposed further upstream than the filter 4 and further downstream than the oxidation catalyst 5, and detects a temperature K of the exhaust gas at the inlet of the filter 4. The temperature sensor 6 is a sensor, concretely, such as a resistance temperature sensor, a thermistor, a sheathed thermocouple in which a thermocouple is inserted in a stainless steel sheath, or the like, which can output an electrical variation as a temperature change. Note that, the temperature sensor 6 may be a bimetal which is set so as to output a signal under the temperature conditions set in advance.

The front oxidation catalyst 7 is disposed at a position close to the engine 2 such as a connecting portion between an exhaust manifold and an exhaust pipe, the inside of an exhaust manifold, or the like, further upstream than the oxidation catalyst 5 in the exhaust gas path 3. The front oxidation catalyst 7 is a catalyst having an oxidizing force greater than or equal to that of the oxidation catalyst 5, and the volume thereof is smaller than that of the oxidation catalyst 5. The bypass path 8 makes the exhaust gas path 3 further upstream than the front oxidation catalyst 7 and the exhaust gas path 3 further downstream than the front oxidation catalyst 7 and further upstream than the oxidation catalyst 5 communicate with one another.

The passage switching device 9 is provided at a branch connection between the exhaust gas path 3 and the bypass path 8. The passage switching device 9 has a catalyst side valve A and a bypass side valve B. The catalyst side valve A disconnects the route communicating with the front oxidation catalyst 7. The bypass side valve B disconnects the route communicating with the bypass path 8. The respective valves A and B are, for example, butterfly type valves, and operate independently. Note that the passage switching device 9 may be a switching valve which makes the exhaust gas path 3 communicate with one of the front oxidation catalyst 7 side or the bypass path 8 side by a plunger or the like.

Figure 2:
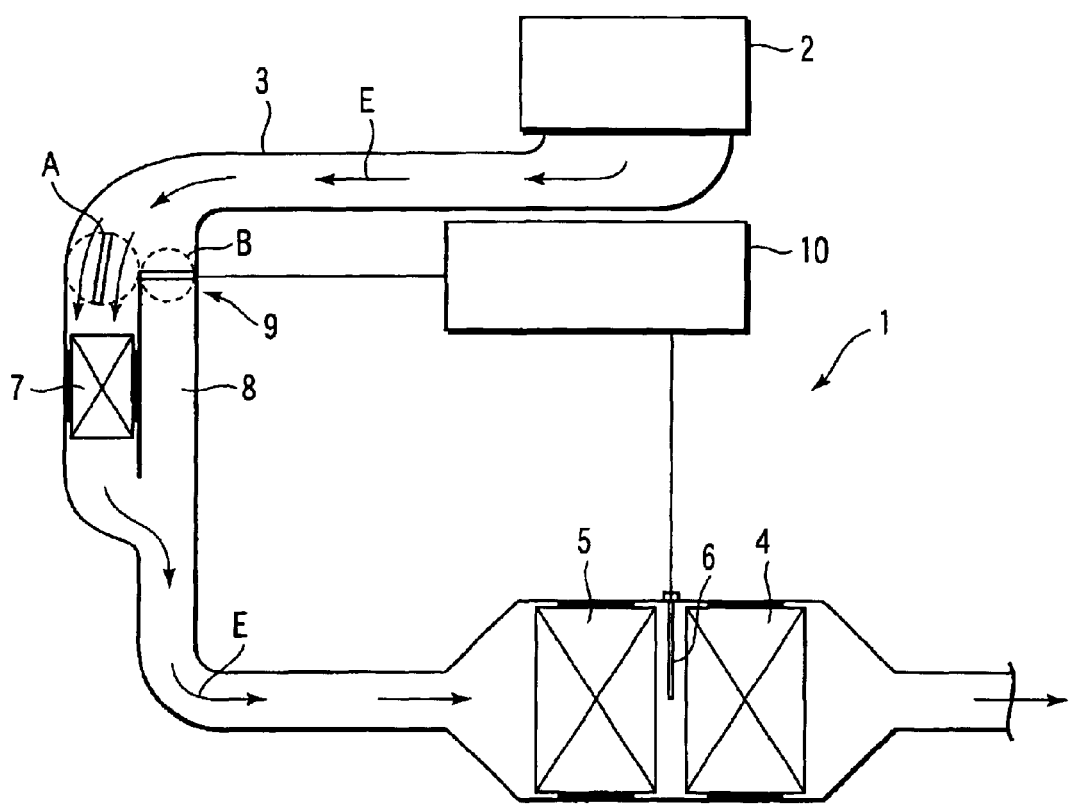
FIG. 2 is a diagram showing a state in which the exhaust gas purifying apparatus of FIG. 1 is at the time of the catalytic temperature raising control.
Figure 3:
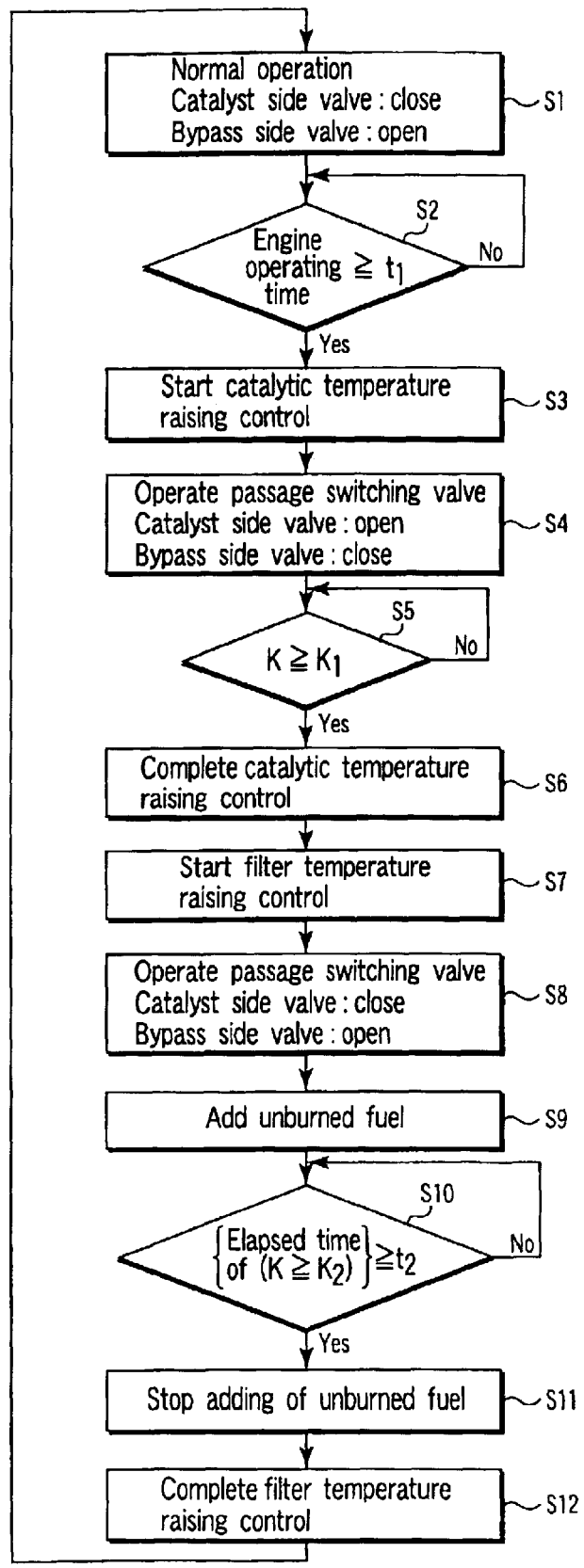
FIG. 3 is a flowchart showing a recovery cycle of the exhaust gas purifying apparatus of FIG. 1.
Figure 4:
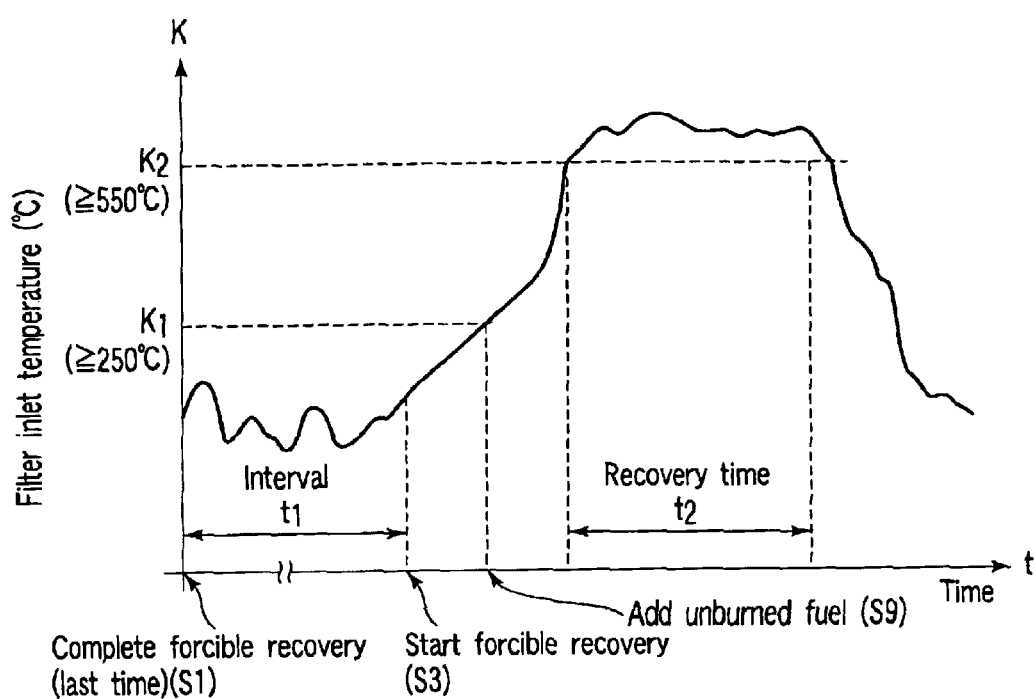
FIG. 4 is a timing chart showing a recovery cycle of the exhaust gas purifying apparatus of FIG. 1.

The control unit 10 is one example of forcible recovering control element, and executes catalytic temperature raising control and filter temperature raising control. In the catalytic temperature raising control, the control unit 10 makes the exhaust gas path 3 communicate with the front oxidation catalyst 7 side by making the passage switching device 9 operate. Namely, as shown in FIG. 2, the catalyst side valve A is opened, and the bypass side valve B is closed. In accordance therewith, the exhaust gas E is transmitted to the oxidation catalyst 5 via the front oxidation catalyst 7. In the filter temperature raising control, the control unit 10 makes the exhaust gas path 3 communicate with the bypass path 8 side by making the passage switching device 9 operate. Namely, as shown in FIG. 1, the catalyst side valve A is closed, and the bypass side valve B is opened.

Further, the control unit 10 has a built-in timer, and a forcible recovering interval time $t_1$ and a recovery time $t_2$ have been preset. The forcible recovery interval time $t_1$ is a time determined in advance by estimating the time when the amount of particulates accumulated at the filter 4 will be in a saturated state. The forcible recovery interval time $t_1$ is appropriately set to an optimum time in accordance with a situation in which the engine 2 is placed. The recovery time $t_2$ is a time which is required for recovering the filter 4 by adding unburned fuel to the filter 4 in a state in which a particulate collecting capacity is saturated. In the control unit 10, temperatures $K_1$ and $K_2$ are further set. The temperature $K_1$ is a temperature which is sufficient for activating the oxidation catalyst 5 and for oxidizing unburned fuel. Further, the temperature $K_2$ is a temperature in which the particulates collected on the filter 4 are oxidized and eliminated.

The exhaust gas purifying apparatus 1 which is structured as described above operates as shown in FIG. 3. When the engine 2 is in a normal operating state (S1), the catalyst side valve A is closed, and the bypass side valve B is opened. Accordingly, the exhaust gas E flows toward the oxidation catalyst 5 via the bypass path 8 as shown in FIG. 1. The oxidation catalyst 5 oxidizes NO included in the exhaust gas E, and generates $NO_2$. When the temperature K exceeds the reaction temperature between $NO_2$ and the particulates, the particulates collected on the filter 4 react with $NO_2$, and are eliminated from the filter 4.

The control unit 10 measures time t by the built-in timer (S2). When the measured time t passes the forcible recovery interval time $t_1$, the control unit 10 starts catalytic temperature raising control in order to forcibly recover the filter 4 (S3). The control unit 10 makes the passage switching device 9 operate, and opens the catalyst side valve A, and closes the bypass side valve B (S4). As a result, the exhaust gas E passes through the front oxidation catalyst 7 as shown in FIG. 2.

Due to the timing of supplying fuel from a fuel injection nozzle (not shown) of the engine 2 or the like being controlled, a temperature of the exhaust gas E is raised. The front oxidation catalyst 7 is disposed at a position close to the engine 2 in the exhaust gas path 3. Accordingly, the exhaust gas E exhausted from the engine 2 arrives at the front oxidation catalyst 7 without the temperature thereof being lowered. In addition, because the volume of the front oxidation catalyst 7 is smaller than that of the oxidation catalyst 5, the temperature thereof is raised for a shorter time as compared with the oxidation catalyst 5.

As a result, because the particulates are oxidized and burnt at the front oxidation catalyst 7, the particulates can be prevented from adhering to the oxidation catalyst 5. Further, due to the particulates being burnt, the temperature of the exhaust gas E is further raised. Accordingly, the temperature of the oxidation catalyst 5 is raised by the exhaust gas E whose temperature was raised under the catalytic temperature raising control.

The oxidation catalyst 5 is activated when the oxidation catalyst 5 reaches a predetermined temperature, and the activated oxidation catalyst 5 further generates heat due to the catalyst reaction, and the temperature rises. The control unit 10 verifies that the temperature K detected as the temperature of the oxidation catalyst 5 by the temperature sensor 6, has reached the temperature $K_1$ which is sufficient for activating the oxidation catalyst 5 and for oxidizing unburned fuel (S5). Then, when it is verified that the temperature K becomes the same temperature of the recovering temperature $K_1$ or more, the control unit 10 completes the catalytic temperature raising control (S6).

Next, the control unit 10 starts the filter temperature raising control (S7). The control unit 10 makes the passage switching device 9 operate, and closes the catalyst side valve A, and opens the bypass side valve B (S8). In accordance therewith, the exhaust gas E exhausted from the engine 2 flows toward the oxidation catalyst 5 via the bypass path 8 as shown in FIG. 1. After the passage switching device 9 is made to operate, the control unit 10 executes, for example, a post-injection in which fuel is supplied from the fuel injection nozzle (not shown) at the exhaust stroke, or supplies fuel from a nozzle separately provided in the exhaust gas path 3 up to the oxidation catalyst 5. In accordance therewith, addition of unburned fuel is executed such that the unburned fuel is included in the exhaust gas E upstream of the oxidation catalyst 5 (S9). The unburned fuel is burnt at the oxidation catalyst 5 whose temperature is raised by the catalytic temperature raising control. Namely, the temperature $K_1$ is greater than or equal to a temperature at which the unburned fuel is oxidized and burnt. Due to the unburned fuel being burnt, the temperature of the exhaust gas E at the inlet of the filter 4 is raised. The particulates are made to react with $O_2$ and to be burnt when a temperature of the ambient becomes about 550° C. or more. Accordingly, when the temperature K of the exhaust gas E is raised to about 550° C. or more which is the temperature $K_2$ at which the particulates are oxidized by $O_2$, because the particulates collected on the filter 4 react with $O_2$, and are forcibly burnt, so that particulates are efficiently eliminated from the filter.

The control unit 10 measures time t in which the temperature K detected by the temperature sensor 6 is maintained at a temperature which is the temperature $K_2$ or more, by the timer (S10). When the measured time passes the recovery time $t_2$, the control unit 10 stops adding the unburned fuel (S11). Because the recovery time $t_2$ is set to a time sufficient for completely burning the particulates collected on the filter 4, the particulates collected on the filter 4 are reliably eliminated. Note that the recovery time $t_2$ may be a variable which varies in accordance with a combustion temperature. Moreover, the recovery time $t_2$ may be a variable which varies in accordance with a reactor rate or a component in the exhaust gas E.

The control unit 10 completes the filter temperature raising control after stopping the addition of unburned fuel (S12). Then, the engine 2 returns to a normal operating state (S1). The control unit 10 carries out timing of the forcible recovery interval time $t_1$ again (S2).

Note that an interval of starting recovery of the filter 4 may be determined by combining the information of the temperature K detected by the temperature sensor 6 and the forcible recovery interval time $t_1$ which is measured by the timer. Further, in the normal operating state, the exhaust gas purifying apparatus 1 continuously recovers the filter 4 due to the exhaust gas E passing through the oxidation catalyst 5 becoming greater than or equal to the temperature at which the particulates are burnt by $NO_2$. Note that, if the above-described series of controls are expressed by a timing chart, it is as in FIG. 4.

As described above, in the exhaust gas purifying apparatus 1, the front oxidation catalyst 7 is provided in the exhaust gas path 3 further upstream than the oxidation catalyst 5, and the bypass path 8 making further upstream and further downstream than the front oxidation catalyst 7 communicate with one another is provided. When the filter 4 is forcibly recovered, the temperature of the exhaust gas E of the engine 2 is raised, the passage switching device 9 is made to operate such that the exhaust gas E passes through the front oxidation catalyst 7, and the temperature of the oxidation catalyst 5 is raised while oxidizing the particulates in the exhaust gas E by the front oxidation catalyst 7. Because the front oxidation catalyst 7 is provided at the side close to the engine 2 and the volume of the front oxidation catalyst 7 is smaller than that of the oxidation catalyst 5, the temperature thereof is raised for a short time. As the particulates generated due to the exhaust gas temperature being raised are efficiently burnt by the front oxidation catalyst 7, there is no case in which the particulates adhere to the oxidation catalyst 5. Further, since heat of reaction at the front oxidation catalyst 7 further raises exhaust gas E, temperature rising of the oxidation catalyst 5 is promoted. When the temperature of the oxidation catalyst 5 is raised to a temperature sufficient for oxidizing unburned fuel, the exhaust gas path 3 is switched from the front oxidation catalyst 7 side to the bypass path B side. Moreover, because the unburned fuel is supplied to the upstream side of the oxidation catalyst 5, and the temperature of the oxidation catalyst 5 is raised to a temperature greater than or equal to the combustion temperature of the particulates, the particulates collected on the filter 4 are efficiently burnt and eliminated. Namely, the exhaust gas purifying apparatus 1 is efficiently recovered.

What is claimed is:

1. An exhaust gas purifying apparatus for an internal combustion engine, comprising:
   a particulate filter which is disposed in an exhaust gas path of the internal combustion engine, and which collects particulates in exhaust gas;
   an oxidation catalyst positioned on the upstream side of the filter and disposed in the exhaust gas path; and
   forcible recovery control element for executing filter temperature raising control in which a temperature of the filter is raised by supplying unburned fuel to the oxidation catalyst after executing catalytic temperature raising control in which the oxidation catalyst is activated by making an exhaust gas temperature of the engine rise, when the filter is forcibly recovered,
   the exhaust gas purifying apparatus for an internal combustion engine, further comprising:
   a front oxidation catalyst positioned further upstream than the oxidation catalyst and disposed in the exhaust gas path;
   a bypass path provided in the exhaust gas path so as to bypass the front oxidation catalyst; and
   a passage switching device which switches the flow of exhaust gas to the front oxidation catalyst side or the bypass path side,
   wherein, at the time of executing the catalytic temperature raising control, the passage switching device switches the flow of exhaust gas to the front oxidation catalyst side, and at the time of executing the filter temperature raising control, the passage switching device switches the flow of exhaust gas to the bypass path side.

2. An exhaust gas purifying apparatus for an internal combustion engine, according to claim 1, wherein a capacity of the front oxidation catalyst is smaller than that of the oxidation catalyst.

3. An exhaust gas purifying apparatus for an internal combustion engine, according to claim 1, wherein the front oxidation catalyst is disposed so as to be closer to the internal combustion engine than the oxidation catalyst.

4. An exhaust gas purifying apparatus for an internal combustion engine, according to claim 1, wherein the passage switching device is switched to the bypass path side other than at the time of the catalytic temperature raising control.

5. An exhaust gas purifying method for an internal combustion engine, comprising:
   a particulate filter which is disposed in an exhaust gas path of the internal combustion engine, and which collects particulates in exhaust gas;
   an oxidation catalyst positioned on the upstream side of the filter and disposed in the exhaust gas path; and
   forcible recovery control element for executing filter temperature raising control in which a temperature of the filter is raised by supplying unburned fuel to the oxidation catalyst after executing catalytic temperature raising control in which the oxidation catalyst is activated by making an exhaust gas temperature of the engine rise, when the filter is forcibly recovered,
   the exhaust gas purifying method for an internal combustion engine, further comprising:
   a front oxidation catalyst positioned further upstream than the oxidation catalyst and disposed in the exhaust gas path;
   a bypass path provided in the exhaust gas path so as to bypass the front oxidation catalyst;
   a passage switching device which switches the flow of exhaust gas to the front oxidation catalyst side or the bypass path side;
   a step of switching, by the passage switching device, the flow of exhaust gas to the front oxidation catalyst side at the time of executing the catalytic temperature raising control; and a step of switching, by the passage switching device, the flow of exhaust gas to the bypass path side at the time of executing the filter temperature raising control.

6. An exhaust gas purifying method for an internal combustion engine, according to claim 5, wherein a capacity of the front oxidation catalyst is smaller than that of the oxidation catalyst.

7. An exhaust gas purifying method for an internal combustion engine, according to claim 5, wherein the front oxidation catalyst is disposed so as to be closer to the internal combustion engine than the oxidation catalyst.

8. An exhaust gas purifying method for an internal combustion engine, according to claim 5, comprising a step of switching the passage switching device to the bypass path side other than at the time of the catalytic temperature raising control.

* * * * *